United States Patent [19]

Okajima et al.

[11] Patent Number: 4,695,301
[45] Date of Patent: Sep. 22, 1987

[54] POROUS CERAMIC MONOLITHS

[75] Inventors: Atushi Okajima, Kariya; Hitoshi Yoshida, Okazaki; Yukihisa Takeuchi, Aichi; Masanori Fukutani, Nagoya, all of Japan

[73] Assignee: Nippondenso Co., Ltd., Kariya, Japan

[21] Appl. No.: 827,718

[22] Filed: Feb. 10, 1986

[30] Foreign Application Priority Data

Feb. 11, 1985 [JP] Japan ................................. 60-24994

[51] Int. Cl.$^4$ ....................... B01D 39/20; C04B 21/06
[52] U.S. Cl. ................................ 55/523; 55/DIG. 30;
210/510.1; 428/116; 422/180; 502/527
[58] Field of Search ......... 55/132, 523, 529, DIG. 30;
210/510.1; 428/116, 118; 422/180; 60/311;
502/527

[56] References Cited

U.S. PATENT DOCUMENTS

| | | | |
|---|---|---|---|
| 4,264,346 | 4/1981 | Mann | 55/523 |
| 4,276,071 | 6/1981 | Ootland | 55/523 |
| 4,283,210 | 8/1981 | Mochida et al. | 55/523 |
| 4,390,355 | 6/1983 | Hammond, Jr. et al. | 55/523 |
| 4,441,899 | 4/1984 | Takagi et al. | 55/485 |
| 4,465,725 | 8/1984 | Riel | 428/116 |
| 4,528,008 | 7/1985 | Takagi et al. | 55/DIG. 30 |

FOREIGN PATENT DOCUMENTS 58-161962 9/1983 Japan .

*Primary Examiner*—David L. Lacey
*Attorney, Agent, or Firm*—Cushman, Darby & Cushman

[57] ABSTRACT

A porous ceramic monolith for use as a filter (1) for Diesel exhaust gases has inlet bores (61) closed at an outlet end (8) of the filter (1) and outlet bores (62) closed at an inlet end (7) of the filter. The inlet and outlet bores (61 and 62) are interlaced with each other and separated from each other by porous partition walls (3) each having gas-permeable pores therein. The inlet and outlet bores have open ends (9) diverged axialy outwardly of the bores to increase opening ratio in each end of the filter (1) thereby decreasing the pressure loss across the filter.

11 Claims, 47 Drawing Figures

FIG. 6
PRIOR ART a: 8 mesh/inch
b: 13 mesh/inch
c: 20 mesh/inch

POROUS CERAMIC MONOLITHS

BACKGROUND OF THE INVENTION

The present invention relates to a porous ceramic monolith which can be used either as a ceramic filter for collecting carbon particulates contained in Diesel exhaust gases or as a catalyst carrier.

DESCRIPTION OF THE PRIOR ART

In the past, porous ceramic filters for collecting Diesel carbon particulates were formed from foamed or honeycomb ceramic monoliths having three dimensional porous ceramic network structures.

Japanese Patent Laid-Open Publication No. 161,962/83 discloses one of the porous ceramic monoliths having low resistance to the passage of gases therethrough and providing a high particulate collecting efficiency. The porous ceramic monolith in question is provided with a plurality of axial bores arranged in a lattice pattern and each having a square shape in cross-section. Some of the bores are closed at one end of the ceramic monolith so that they act as inlet bores, while the other bores are closed at the other end of the monolith so that they act as outlet bores. The inlet and outlet bores are disposed in interlaced relationship with each other. In such porous structures, the particulate collecting efficiency is increased with the increase in the thickness of a partition wall between each adjacent pair of inlet and outlet bores. In addition, the pressure loss across the porous ceramic monolith is decreased with the increase in the ratio of the total of the cross-sectional areas of the inlet and outlet bores relative to the entire cross-sectional area of the monolith (this ratio will be called hereunder as "cross-sectional opening ratio").

In the prior art porous ceramic monolith structure, if the cross-sectional opening ratio is increased in an attempt to lower the pressure loss, the wall thickness is decreased with a resultant disadvantageous decrease in the particulate collecting efficiency. Thus, it was considered in the art that there was a limit to the increase in the cross-sectional opening ratio.

SUMMARY OF THE INVENTION

Through extensive researches conducted by the inventors, it has been ascertained that the pressure loss across a porous ceramic monolith takes place most at a point adjacent to the open end of each of the inlet and outlet bores, rather than at a point between the ends of each bore. The present invention, therefore, provides a porous ceramic monolith in which the open ends of at least some of the axial bores in the monolith are diverged axialy outwardly to increase the cross-sectional opening ratio at a point adjacent to the associated end of the monolith. This structure advantageously prevents the occurrence of turbulence in the flow of gases at the open ends of the axial bores, thereby reducing the pressure loss across the porous ceramic monolith.

The above and other objects, features and advantages of the present invention will be made more apparent by the following description of preferred embodiments of the present invention with reference to the accompanying drawings.

BRIEF DESCRIPTION OF THE DRAWINGS

FIG. 8A is an enlarged schematic illustration of the open ends of some of the axial bores in the porous ceramic monolith shown in FIGS. 8A and 8B;

FIGS. 14A through 22G illustrate further embodiments of the invention;

DESCRIPTION OF THE PREFERRED EMBODIMENTS

A ceramic filter 1 formed by a cylindrical porous ceramic monolith consisting of a cordierite ceramic material has an outer diameter of 107 mm and an axial length of 78 mm. The ceramic monolith may alternatively be formed by any one of other ceramic materials such as SiC, Si$_3$N$_4$, Al$_2$O$_3$ and β-spodumene. The ceramic monolith has an outer reinforcing layer 2 having a thickness of 2 mm and formed by the same ceramic material having a greater density. The cylindrical ceramic monolith is formed therein with a plurality of axial bores arranged in a lattice pattern and each having a square cross-section. The axial bores are separated by axial partition walls 3 each formed by a three dimensional porous ceramic network 4 (FIG. 2) defining therein fine or minute gas permeable pores 5. Some of the axial bores are open in an inlet end face 7 of the filter 1 and closely by end walls 7a in an outlet end face 8 of the filter to form gas inlet bores 61. The other axial bores are closed by end walls 8a in the inlet end face 7 and open in the outlet end face 8 to form gas outlet bores 62. There are 113 inlet bores 61 and 113 outlet bores 62. The inlet and outlet bores 61 and 62 are arranged in interlaced relationship with each other; namely, each of the inlet bores 61 is surrounded by four outlet bores 62 and each of the outlet bores 62 is surrounded by four inlet bores 61, as will be best seen in FIG. 1A. The total of the cross-sectional areas of the inlet and outlet bores 61 and 62 forms 20% of the entire cross-sectional area of the porous ceramic monolith. This ratio will be called as "cross-sectional ratio". Each of the open ends of the inlet and outlet bores 61 and 62 is axially outwardly diverged as at 9 to provide a square outer end opening 10 which is larger than the square of the cross-section of each axial bore and angularly displaced or rotated 45 degrees about the axis of the axial bore. The total of cross-sectional areas of the square end openings 10 forms more than 50% of the entire area of the associated end face 7 or 8 of the ceramic filter 1. This ratio will be called as "end opening ratio".

Figures 1A, 1B, 1C:
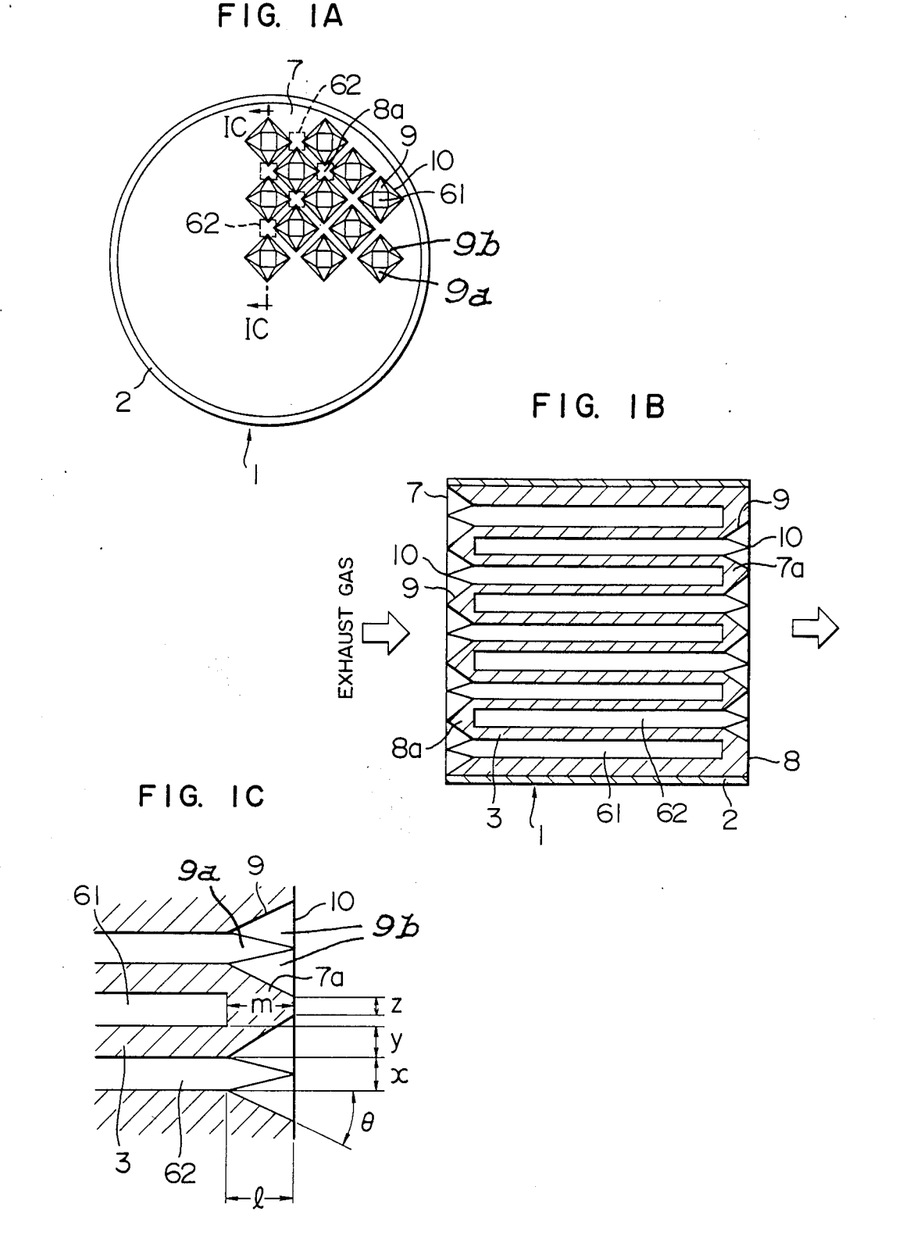
FIG. 1A is an end view of an embodiment of a porous ceramic monolith according to the present invention.
FIG. 1B is an axial sectional view of the porous ceramic monolith shown in FIG. 1A.
FIG. 1C is an enlarged fragmentary sectional view of the monolith taken along line IC—IC in FIG. 1A.
Figure 2:
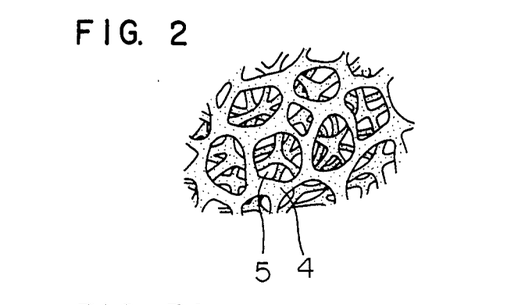
FIG. 2 is a further enlarged fragmentary schematic illustration of the porous ceramic structure of the ceramic monolith shown in FIGS. 1A and 1B.
Figure 10:
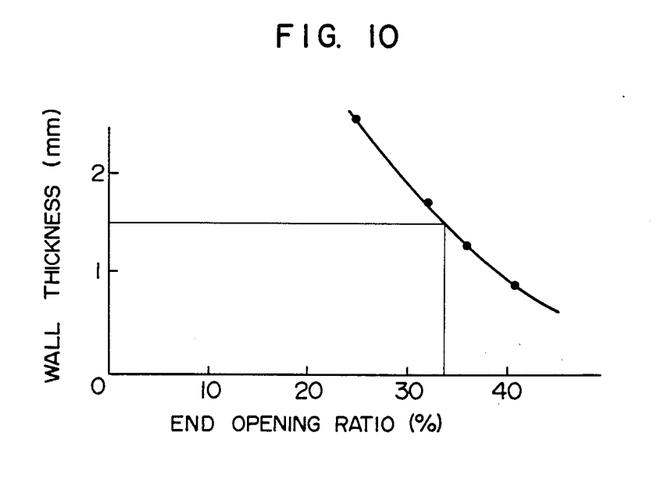
FIG. 10 is a graphical illustration of the relationship between the partition wall thickness and the end opening ratio obtained in the second embodiment of the invention.

As will be seen in FIG. 1A, the axially outwardly diverged end 9 of each of the inlet and outlet bores 61 and 62 is formed by eight triangular faces including four triangular faces 9a each having a base formed by one of the four sides of the square of the cross-section of each bore, each of the four other triangular faces 9b having a side formed by one of the four sides of the square of the end opening 10, as will be seen in FIGS. 1A and 10. However, each diverged end 9 may alternatively be formed by a face or faces of any other shape including a curved face.

In the illustrated embodiment of the invention, each side of the square cross-section of each of the inlet and outlet bores 61 and 62 has a dimension x of 3 mm. The partition wall 3 between each adjacent pair of axial bores 61 and 62 has a thickness y or 3 mm. Each of the end walls 7a and 8a of the axial bores 61 and 62 has an axial thickness m of 5 mm. Each of the axially outwardly diverged ends 9 of the axial bores has an axial dimension l of 5 mm. The ceramic material of the partition walls 3 has a porosity of 13 mesh/inch. The divergence of each diverging end 9 is of an angle θ as measured in the axial section shown in FIG. 1C which is taken along line IC—IC in FIG. 1A.

The dimension l depends upon the dimensions x, y, m, and θ and may range from 5 to 20 mm. The angle θ depends upon the dimensions l, x, y and m and may preferably range from 20 to 45 degrees. This angular range is determined based on the consideration of the above conditions and of a requirement that the space between adjacent opposed sides of adjacent square end openings 10 should be more than 1.5 mm in order to prevent this edge portion from being broken or damaged.

Then, a method of producing the porous ceramic monolith which forms the ceramic filter 1 will be described hereunder. The ceramic monolith 1 can be manufactured by a method in which a form of an organic composition such as polyurethane foam having three dimensional porous network structure similar to that in the partition walls in the required porous ceramic monolith is impregnated with a ceramic slurry which is then dried. Thereafter, the organic material is burnt away from the ceramic material whereby the residual ceramic material forms three dementional porous ceramic network structure.

Figure 3A:
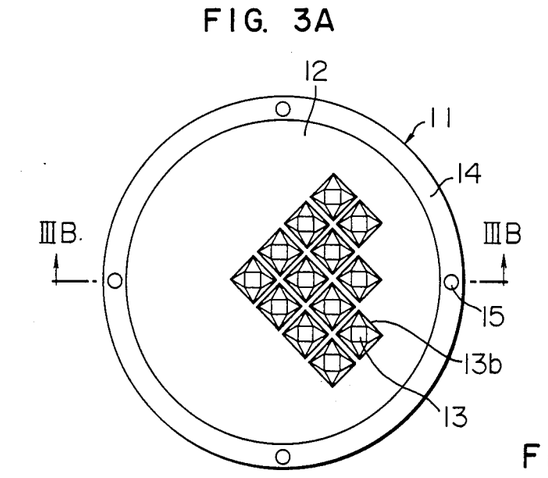
FIGS. 3A and 3B are a top plan view and an axial sectional side elevation, respectively, of a container section of a mold used in the manufacture of the ceramic monolith.
Figure 3B:
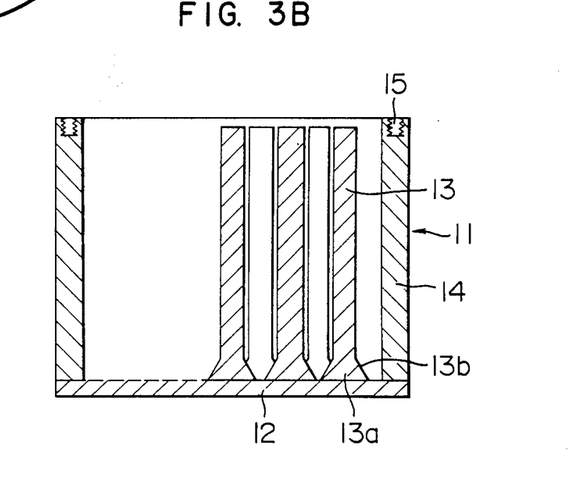
Figure 4A:
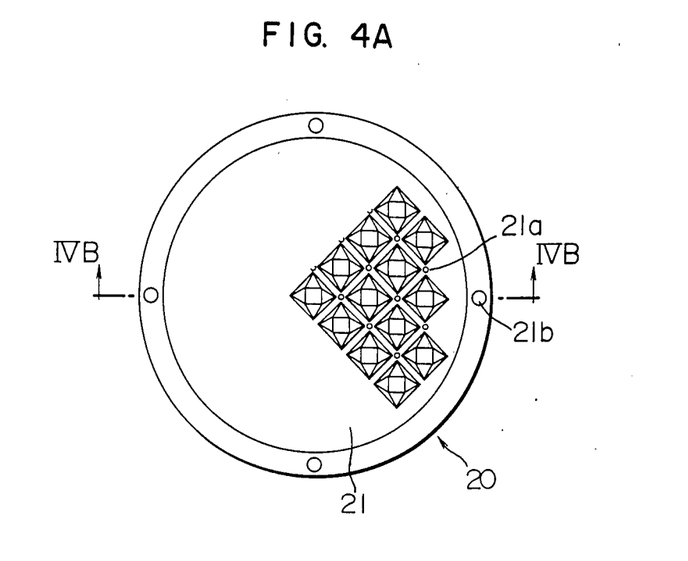
FIGS. 4A and 4B are a top plane view and an axial sectional side elevation, respectively, of a lid section of the mold.
Figure 4B:
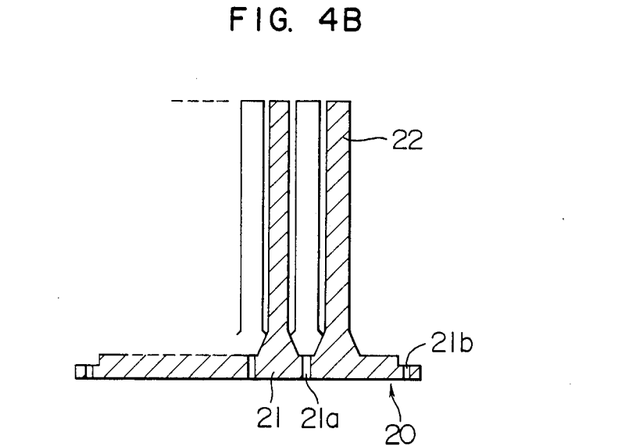
Figure 5:
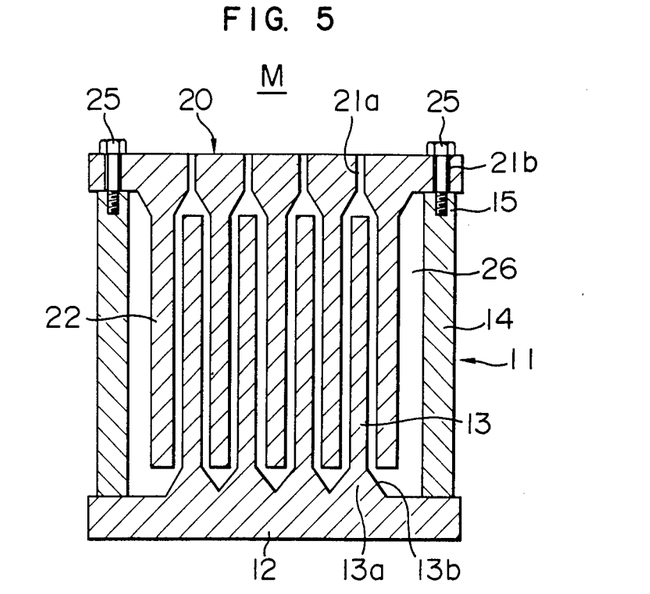
FIG. 5 is an axial sectional side elevation of the mold formed by the assembly of the container section and the lid section shown in FIGS. 4A and 4B.

FIGS. 3–5 show a mold M for molding the form of polyurethane foam. The mold M consists of a container section 11 shown in FIGS. 3A and 3B and a lid section 20 shown in FIGS. 4A and 4B. The container section 11 includes a circular bottom wall 12, a plurality of posts 13 each having a square cross-section and secured at its bottom end to the bottom wall 12 and a cylindrical peripheral wall 14 secured at its bottom end to the bottom wall 12 and extending around the group of the posts 13. Each post 13 has a downwardly diverging bottom end portion 13a corresponding in shape to the axially outwardly diverged end 9 of each of the axial bores 61 and 62 in the ceramic filter 1. The bottom end portion 13a is of a square cross-section which is angularly displaced or rotated 45 degrees relative to the square cross-section of the post 13. The cylindrical peripheral wall 14 has an annular top end face in which a plurality of screw holes 15 are formed in circumferentially equally spaced relationship.

The lid section 20 is formed by a lid plate 21 and a plurality of posts 22 each secured at one end to the plate 21. The posts 22 are arranged and disposed such that, when the container section 11 and the lid section 20 are assembled together to form the mold M, as shown in FIG. 5, the posts 13 and 22 are interlaced to form a mold cavity 26 therebetween. The lid plate 21 is formed therein with a plurality of gas holes 21a communicated with the mold cavity 26. The lid section 20 can be detachably secured to the container section 11 by means of screws or bolts 25 which extend into the screw holes 15 in the container section 11 through aligned holes 21b formed in the lid plate 21.

The urethane foam is molded as follows:

The inner surface of the mold cavity 26 is coated with a wax-based releasing agent by spraying or brushing. For this purpose, the releasing agent is heated in advance to a temperature above the melting point thereof. The temperature of the container section 11 and the lid section 20 is adjusted to be between 20° C. and 50° C. Then, an urethane foam material consisting of a mixture of an organic isocyanate, polyol, foam-adjusting agent, a foaming agent and catalysts is poured into the container section 11 of the mold M while the mixture is agitated. Then, the container section 11 is closed with the lid section 20. The organic isocyanate may be tolylene diisocyanate, methylene diisocyanate or a mixture thereof. The polyol may be polyether polyol, polyester polyol or a mixture thereof. The foaming agent may be water, halogen-substituted aliphatic hydrocarbon (phlorone such as trichloromonofluoromethane) or a mixture thereof. The foam adjusting agent may be alcohol modified silicone. The catalyst for expediting reaction between alchol and isocyanate may be tertiary amine or an organic tin catalyst. The catalyst for expediting reaction between water and isocyanate may be morpholoine or ethanolamine. The urethane foam mixture is foamed in the mold cavity 26 to force air therefrom outwardly through the holes 21a. After the air has been discharged from the cavity 26, the holes 21b should be closed to prevent the foam from overflowing through the holes 21b. After the mixture has been foamed, the mold M with foam therein is heated to a temperature of from 100° C. to 120° C. for a time period of from 20 to 60 minutes to cure the foamed urethane. Thereafter, the mold M will be opened to take out the foamed urethane therefrom.

The urethane foam will then be impregnated with ceramic slurry which consists of a mixture of mixed powder including MgO, $Al_2O_3$, and $SiO_2$ which becomes cordierite composition upon calcination, either composite cordierite powder prepared by heating the above-mentioned mixed powder into cordierite ceramic and then reducing the cordierite ceramic into the powder, or a mixture of the above-mentioned mixed powder and the composite cordierite powder, a binder such as methyl cellulose, polyvinyl alcohol or the like, and water. After the urethane foam has been impregnated with the ceramic slurry, excessive slurry is removed from the form of urethane foam by using air gan or centrifugal machine. Then, the urethane foam form with the ceramic slurry therein is heated at a temperature of from 80° to 120° C. for time period of from 2 to 3 hours. The above steps will be repeated two or three times until the porous three dimensional network structure of the urethane foam form is coated with a desired amount of the ceramic slurry. Thereafter, the form with the ceramic coating therein will be subjected to calcination at 1300° to 1400° C. for 5 to 6 hours to remove the urethane foam from the ceramic material whereupon the porous ceramic monolith is thus obtained.

Figure 6:
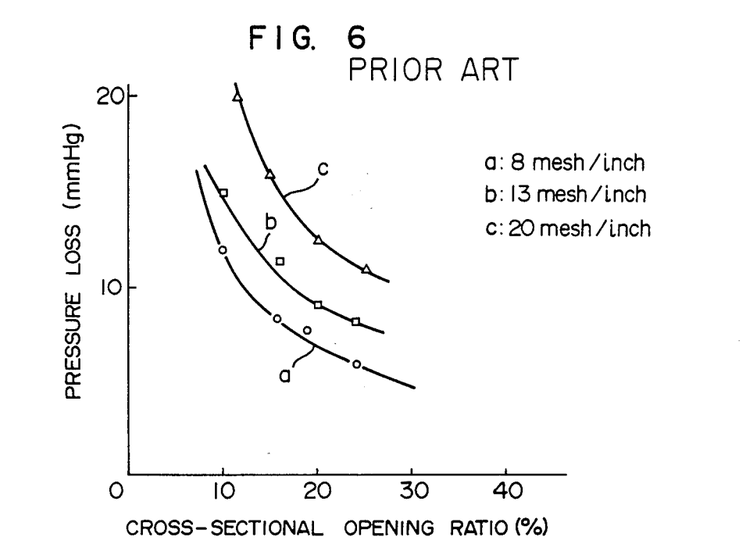
FIG. 6 is a graphical illustration of the relationship between the pressure loss and the cross-sectional opening ratio obtained in the prior art porous ceramic monolith.
Figure 24A:
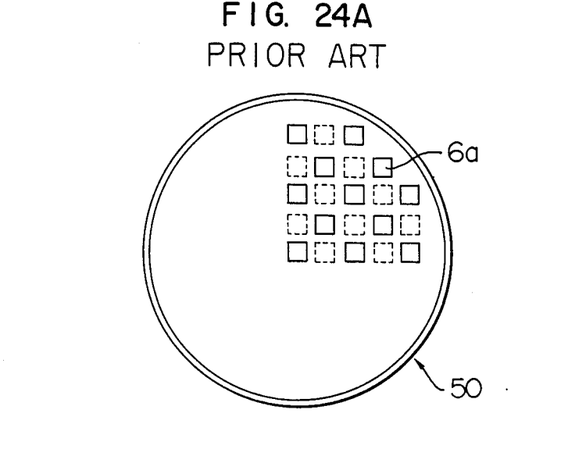
FIGS. 24A and 24B are an end view and an axial sectional view of the prior art porous ceramic monolith, respectively.
Figure 24B:
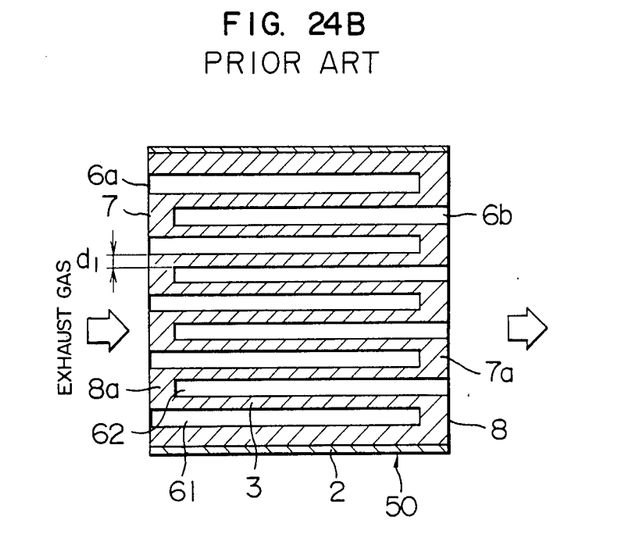

FIG. 6 shows results of tests conducted on the prior art porous ceramic filter 50 shown in FIGS. 24A and 24B concerning the relationship between the cross-sectional opening ratio and the pressure loss. The prior art filter 50 was of a cylindrical shape having an outer diameter of 107 mm, a length of 78 mm, 113 inlet bores 61 and 113 outlet bores 62, the bores 61 and 62 each having square cross-sectional with each side of the square being 3 mm. The inlet and outlet bores 61 and 62 were separated by partition walls 3 each having a thickness of 5 mm. The inlet and outlet bores 61 and 62 were closed by end walls 7a and 8a each having a thickness of 5 mm. The prior art filter 50 was disposed in a path of a flow of exhaust gases discharged from a Diesel engine at 3 m³ per minute. The tests were conducted on three kinds of the prior art ceramic filters having three dimensional porous ceramic structures of 8 mesh/inch, 13 mesh/inch and 20 mesh/inch, respectively. It will be seen in FIG. 6 that, in all cases, the pressure loss was decreased with increase in the cross-sectional opening ratio. However, if the cross-sectional areas of the inlet and outlet bores 61 and 62 are increased in an attempt to increase the cross-sectional opening ratio, the thickness $d_1$ of the partition walls 3 is decreased with a resultant decrease in the efficiency of collecting the carbon particulates.

Figure 7:
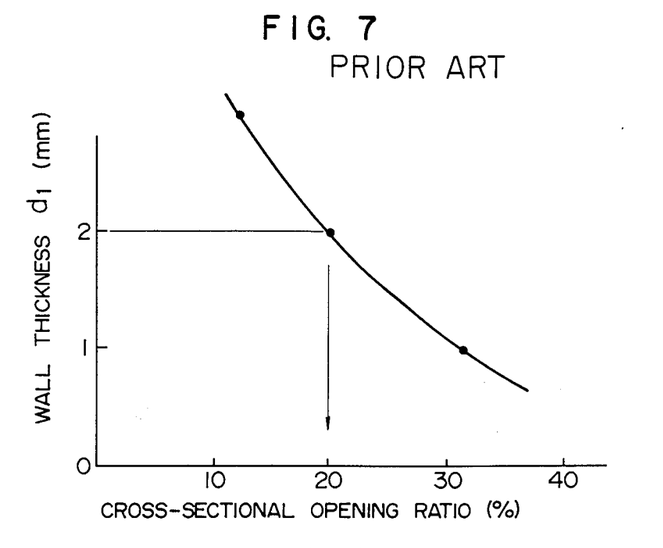
FIG. 7 is a graphical illustration of the relationship between the partition wall thickness and the cross-sectional opening ratio obtained in the prior art porous ceramic monolith.

FIG. 7 shows the relationship between the wall thickness d1 (mm) and the cross-sectional opening ratio obtained from the ceramic filter having 20 mesh/inch three dimensional porous ceramic structure. It was ascertained through another test that the wall thickness d1 (FIGS. 24A and 24B) should be more than 2 mm in order to attain a satisfactory level of the particulate collecting efficiency. It will be seen in FIG. 7 that the required wall thickness d1 of 2 mm corresponds to cross-sectional opening ratio of about 20%. As such, there was a definite limit in the prior art structure to the attempt to increase the cross-sectional opening ratio so as to reduce the pressure loss.

Figure 8A:
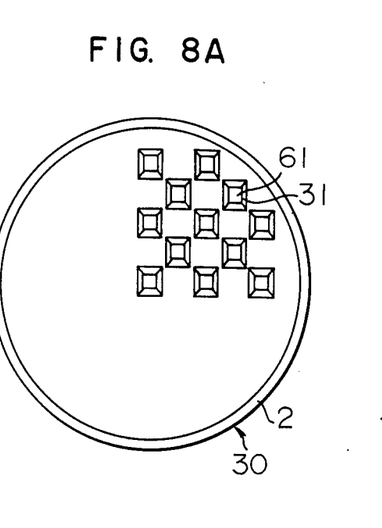
FIG. 8A and 8B are an end view and an axial sectional view, respectively, of a second embodiment of the porous ceramic monolith according to the present invention.
Figure 8B:
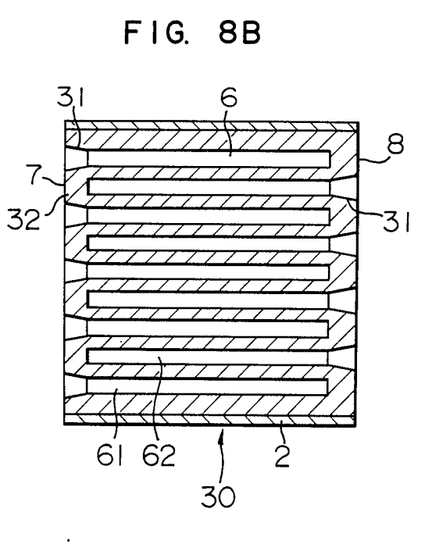
Figure 8C:
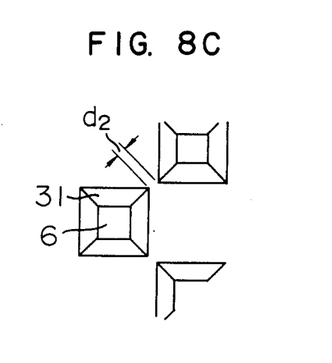

FIGS. 8A to 8C show a ceramic filter 30 of a second embodiment of the invention. The filter 30 has inlet and outlet bores 61 and 62 having axially outwardly diverged ends 31 each of a square cross-section with the sides of the square being parallel to the sides of the square cross-section of the axial bore 61 and 62. The inlet and outlet bores 61 and 62 are each closed at one end by an end wall 32. The pores in the three dimensional porous ceramic structure is of 20 mesh/inch. The other dimensions of the filter 30 are equal to those of the prior art filter 50 shown in FIGS. 24A and 24B.

Figure 9:
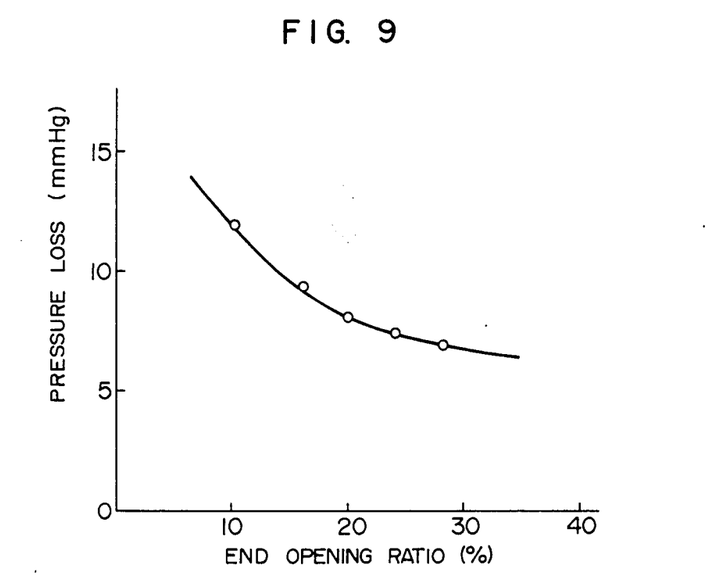
FIG. 9 is a graphical illustration of the relationship between the pressure loss and the end opening ratio obtained in the second embodiment of the present invention.

FIG. 9 shows the relationship between the pressure loss and the ratio of the total of the sectional areas of the open ends 31 of the inlet or outlet bores 61 or 62 relative to the inlet or outlet end face 7 or 8 of the filter 30. A comparison between FIGS. 6 and 9 will show that the pressure loss is decreased in the second embodiment 30 of the invention than in the prior art. However, increase in the areas of the openings of the diverging ends 31 of the inlet and outlet bores 61 and 62 in an attempt to increase the end opening ratio will cause a problem that a wall thickness d2 shown in FIG. 8C is decreased with a resultant decrease in the strength of this portion. In order to obtain a satisfactory strength of this portion, the wall thickness d2 should be about 1.5 mm which corresponds to an end opening ratio of about 34%, as will be seen in FIG. 10.

Figure 11:
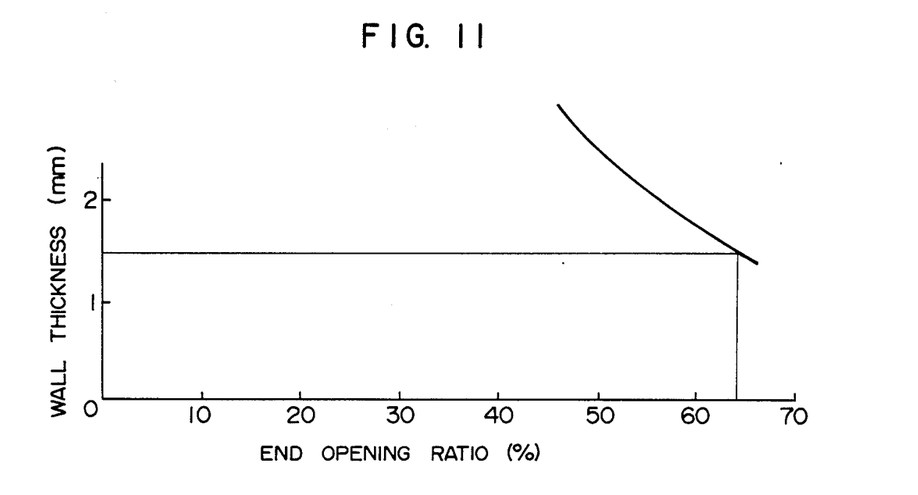
FIG. 11 is a graphical illustration of the relationship between the wall thickness and the end opening ratio obtained in the first embodiment of the invention.

In this concern, in the first embodiment of the invention in which the axially outwardly diverged ends 9 of the inlet and outlet bores 61 and 62 are each of square shape which is rotated 45 degrees relative to the square cross-sectional shape of the bore 61 or 62, the interference between adjacent squares of the diverged ends 9 is relieved to assure that, if the distance z (FIG. 1C) between the opposed adjacent sides of the squares of the adjacent diverged ends 9 of the bores 61 and 62 is dimensioned to be of 1.5 mm, the opening ratio in the inlet end face 7 or outlet end face 8 can be increased up to 64%, as will be seen in FIG. 11.

Figure 12:
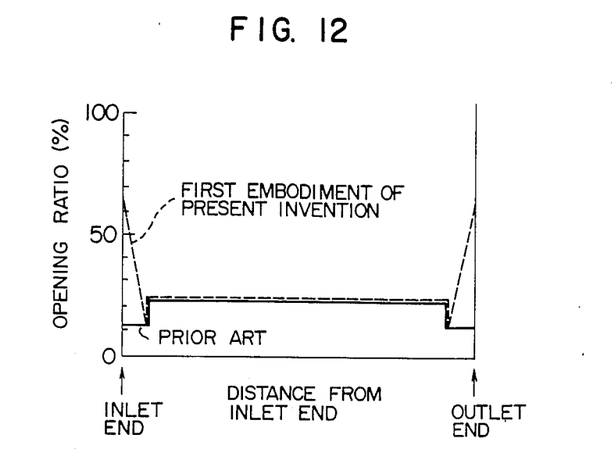
FIG. 12 diagrammatically illustrates the changes, in the axial direction, of the opening ratios of the porous ceramic monoliths of the first embodiment of the invention and of the prior art.

FIG. 12 shows the changes of the opening ratios of the first embodiment of the invention and of the prior art obtained in the axial direction thereof. It will be seen that, compared with the prior art ceramic filter 50 shown in FIGS. 24A and 24B, the first embodiment of the invention provides a greatly increased opening ratio at points adjacent to the end faces 7 and 8.

Figure 13:
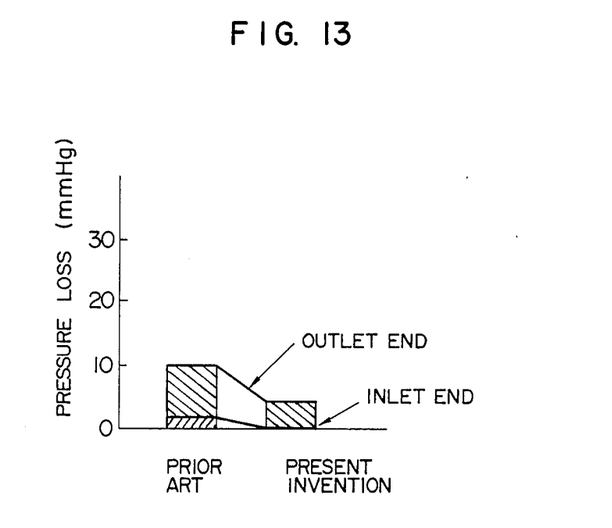
FIG. 13 diagrammatically illustrates the pressure losses obtained in the porous ceramic monoliths of the first embodiment of the invention and of the prior art.

FIG. 13 shows results of tests concerning the pressure losses of the prior art ceramic filter 50 having a porosity of 20 mesh/inch and of a ceramic filter of the first embodiment of the present invention having a porosity of 20 mesh/inch as in the prior art. It will be seen that the prior art ceramic filter exhibited a total pressure loss of 10 mmHg, whereas the ceramic filter of the first embodiment of the invention exhibited a substantially lower pressure loss produced only at the outlet end (i.e., no pressure loss was produced at the inlet end).

Figure 14A:
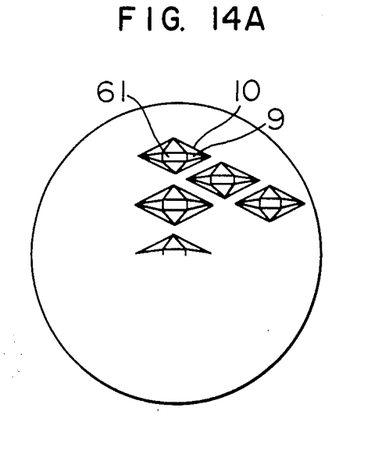
Figure 14B:
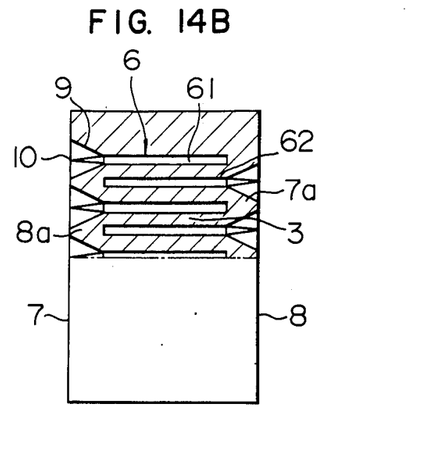
Figure 15A:
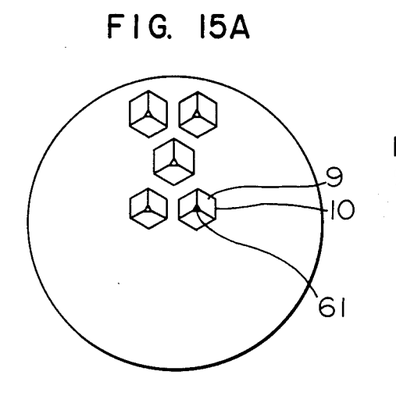
Figure 15B:
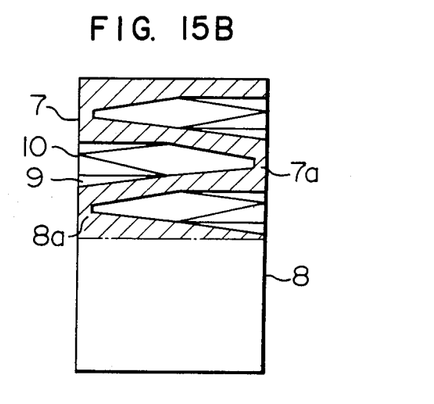

The present invention is not limited to the described and illustrated embodiments. For example, the square-cross section of each of the axially outwardly diverged ends of the inlet and outlet bores 61 and 62 can be rotated an angle other than 45 degrees relative to the square of the cross-section of the axial bore 61 or 62. Each of the axially outwardly diverged ends 9 of the axial bores 61 and 62 may alternatively be of either such a quadlilateral shape as shown in FIGS. 14A and 14B or such a polygonal shape as shown in FIGS. 15A and 15B. In the modification shown in FIGS. 15A and 15B, each of the axial bores 61 and 62 is of a triangular cross-section and has an axially outwardly diverged end 9 of hexagonal shape. Each of the axial bores 61 and 62 is diverging toward its axially outwardly diverging end 9.

Figures 16A, 16B:
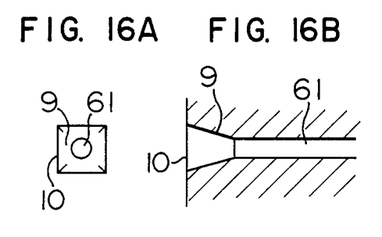
Figure 17A:
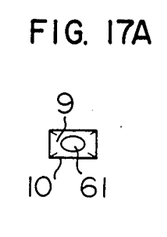
Figure 17B:
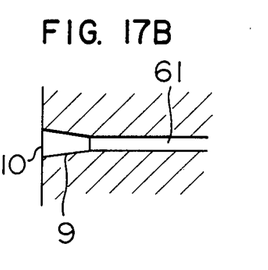
Figure 18A:
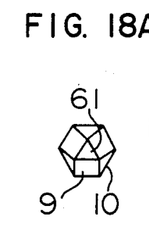
Figure 18B:
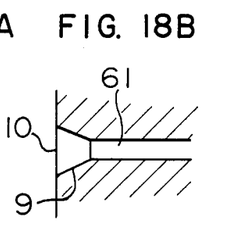
Figures 19A, 19B:
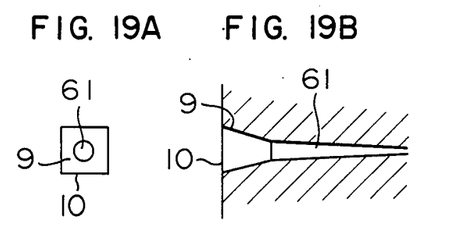
Figure 20A:
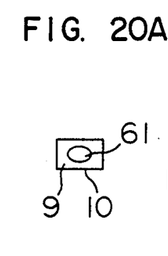
Figure 20B:
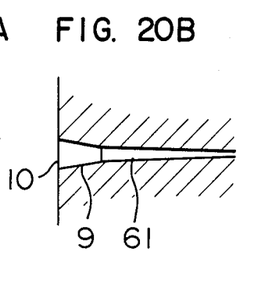
Figure 21A:
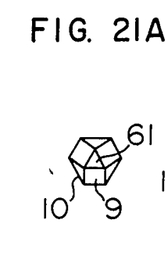
Figure 21B:
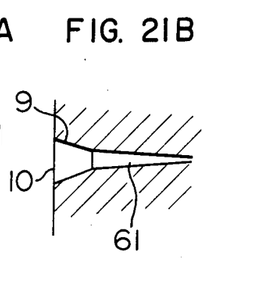
Figure 22A:
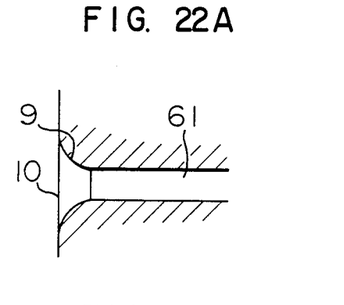
Figure 22B:
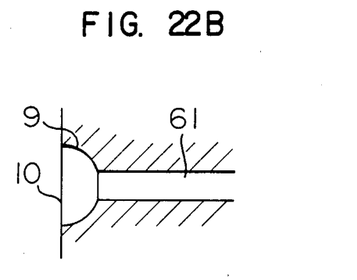
Figure 22C:
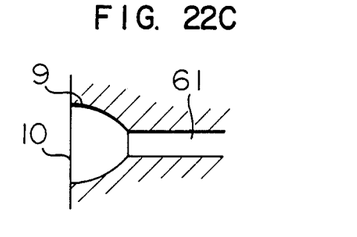
Figure 22D:
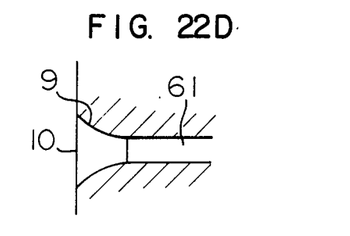
Figure 22E:
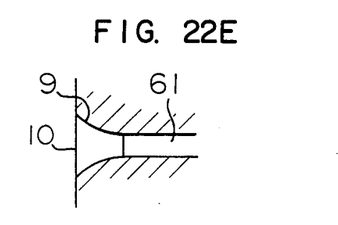
Figure 22F:
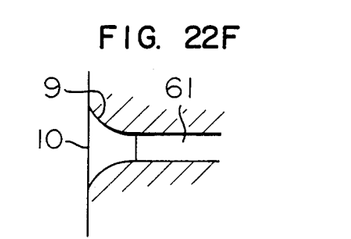
Figure 22G:
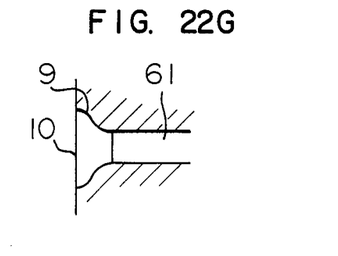
Figure 23A:
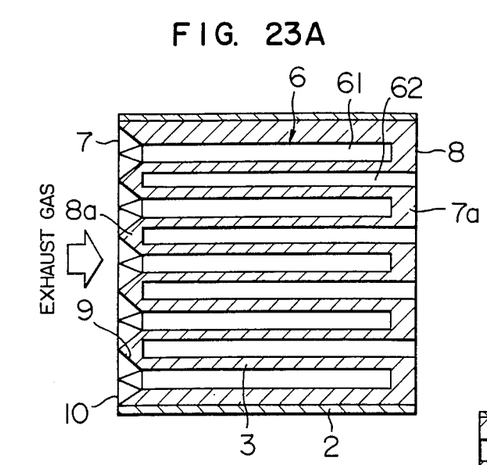
FIG. 23A–23C illustrate further embodiments of the invention.
Figure 23B:
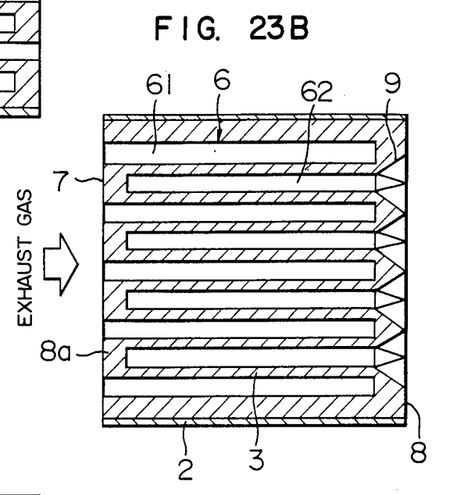
Figure 23C:
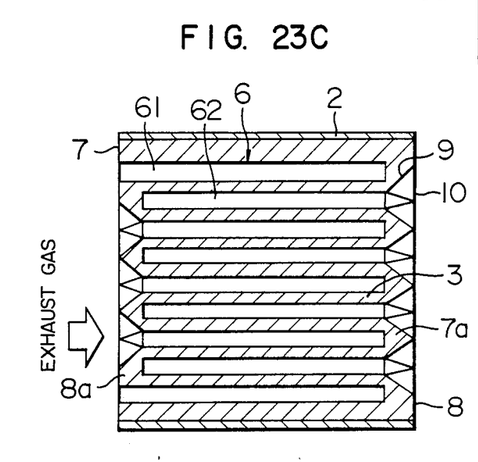

The square cross-section of each of the inlet and outlet bores 61 and 62 may be modified to a circular shape as shown in FIGS. 16A and 16B, an oval shape as shown in FIGS. 17A and 17B, triangular shape as shown in FIGS. 18A and 18B or any other polygonal shape. The axial bore 61 and 62 may be converged toward their closed ends, as shown in FIGS. 19A and 19B, 20A and 20B and 21A and 21B. Moreover, the axially outwardly diverged end 9 of each of the axial bores 61 and 62 may have axial sectional shapes shown in FIGS. 22A through 22G. More specifically, the axial sectional shape of the diverged end 9 can be defined by a part of a circle, as shown in FIG. 22A, by a part of oval as shown in FIGS. 22C and 22D, by a part of parabola as shown in FIG. 22E, by a part of a hyperbola as shown in FIG. 22F or by a part of a sine curve as shown in FIG. 22G. Further more, the axially outwardly diverged ends 9 may be provided either only in the inlet end face 7 of the porous ceramic monolith, as shown in FIG. 23A, or only in the outlet end face 8 thereof, as shown in FIG. 23B. Further alternatively, all of the inlet and outlet bores 61 and 62 may be provided with axially outwardly diverged ends 9 excepting the radially outermost row of bores, as shown in FIG. 23C. It will be appreciated that even the modifications shown in FIGS. 23A to 23C can achieve a reduction of pressure loss to a certain extent.

What is claimed is:

1. A porous ceramic monolith having an inlet end wall and an outlet end wall and including a plurality of bores having substantially parallel axes and separated from each other by porous partition walls, some of said bores being closed by said inlet end wall and opened in an outer end face of said outlet end wall to provide outlet bores and the other of said bores being closed by said outlet end wall of said ceramic monolith and opened in an outer end face of said inlet end wall to provide inlet bores, said inlet and outlet bores being interlaced such that a flow of fluid entering said inlet bores is allowed to pass through the pores in said partition walls into said outlet bores, wherein the open ends of at least said inlet bores are diverged outwardly and wherein each of said end walls has a first thickness measured in the axial direction of said bores and each of said partition walls has a second thickness measured in a direction perpendicular to the axes of said bores, said first thickness being greater than said second thickness.

2. A porous ceramic monolith as defined in claim 1, wherein all of said bores are arranged in a lattice pattern in a plane substantially perpendicular to the axes of all of said bores.

3. A porous ceramic monolith as defined in claim 2, wherein all of the bores excepting the outermost of said bores have outwardly diverged open ends.

4. A porous ceramic monolith as defined in claim 1, wherein all of said bores have outwardly diverged ends and each of said bores has an axially substantially uniform cross-sectional shape excepting the outwardly diverged end thereof.

5. A porous ceramic monolith as defined in claim 4, wherein the cross-sectional shape of each of said bores is selected from a group consisting of square shape, circular shape, rectangular shape, oval shape, triangular shape and any polygonal shape other than triangle and rectangle.

6. A porous ceramic monolith as defined in claim 1, wherein all of said bores have outwardly diverged ends and each of said bore excepting the outwardly diverged end thereof has a cross-sectional area which is gradually reduced toward the closed end.

7. A porous ceramic filter as defined in claim 1, wherein each of the outwardly diverged ends has an end opening of a shape selected from a group consisting of square shape, rectangular shape and any other parallelogram.

8. A porous ceramic monolith according to claim 1, wherein all of said bores have outwardly diverged ends and each have square cross-sectional shape and the outwardly diverged end of each of said bore has an end opening of square shape which is rotated substantially 45 degrees relative to the square of the cross-section of the respective bore.

9. A porous ceramic monolith according to claim 1, wherein all of said bores have outwardly diverged ends and each has a square cross-sectional shape and the outwardly diverged end of each of said bores has an end opening of square cross-sectional shape having it sides substantially parallel to the sides of the square of the cross-section of the respective bore.

10. A porous ceramic monolith as defined in claim 1, wherein all of the bores have outwardly diverged ends and are arranged in a lattice pattern in a plane substantially perpendicular to the axes of all of said bores and wherein all of said bores each have square cross-sectional shape and the outwardly diverged end of each of said bores has an end opening of square shape which is rotated substantially 45 degrees relative to the square of the cross-section of the respective bore.

11. A porous ceramic monolith as defined in claim 10, wherein the outwardly diverged end of each of said bores is formed by eight triangular faces including four triangular faces each having a base formed by one of the four sides of the square of the cross-section of the respective bore and four other triangular faces having a base formed by one of the four sides of the square of the end opening of each outwardly diverged end.

* * * * *